UNITED STATES PATENT OFFICE.

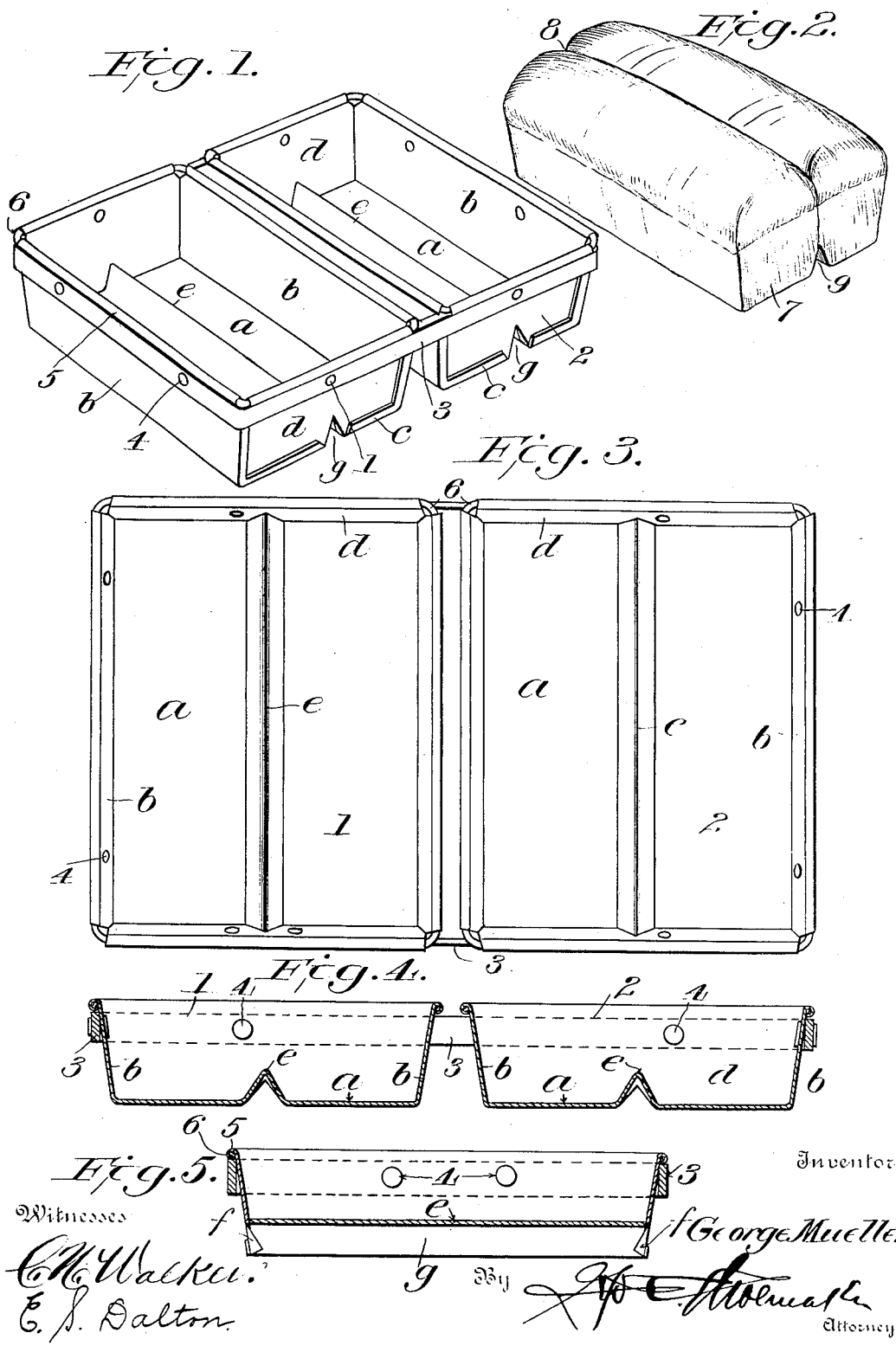

GEORGE MUELLER, OF SALT LAKE CITY, UTAH.

BAKING-PAN.

943,093. Specification of Letters Patent. Patented Dec. 14, 1909.

Application filed August 7, 1909. Serial No. 511,791.

*To all whom it may concern:*

Be it known that I, GEORGE MUELLER, a citizen of the United States, residing at Salt Lake City, in the county of Salt Lake and State of Utah, have invented certain new and useful Improvements in Baking-Pans, of which the following is a specification.

This invention relates to baking pans.

One object is to provide a baking pan adapted for baking a twin, Siamese or double loaf of bread or cake, which is completely protected by a proper crust and so grooved and divided both on top and bottom that it may be sold as one loaf or broken and sold as two loaves.

Another object of the invention resides in the provision of a pan embodying such characteristics that it will cause the formation of a depression or groove in the bottom of the loaf so as to divide the same into two equal parts and cause the upper crust of the loaf to part along a line directly above and parallel to the depression or groove in the lower crust.

A still further object of the invention resides in the provision of a simple, inexpensive, durable and efficient baking pan particularly adapted for economically and expeditiously baking twin, Siamese or double loaves of bread, cake, meat loaves, or pastry by increasing the area in which heat is applied to the bread, cake, or food being baked, with the result that the baked food will remain fresh longer than single loaves.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a perspective view of my improved pan illustrating two of them connected together. Fig. 2 is a perspective view of a twin or Siamese or double loaf of bread as it appears for the market after being baked in my improved pan. Fig. 3 is a top plan view of two pans connected together. Fig. 4 is a transverse sectional view through the pans illustrated in Fig. 3. Fig. 5 is a longitudinal sectional view through the ridge of one of the pans.

Referring now more particularly to the accompanying drawings, the reference characters 1 and 2 indicate pans connected together through the instrumentality of a metallic strap 3 which is riveted or otherwise secured at intervals, as at 4, to the upper outer edges of the pans and preferably beneath the strengthening bead 5, which envelops the strengthening wire 6.

Each pan comprises a bottom $a$ and sides $b$ formed of a single piece of sheet metal or other suitable material, with the edges $c$ bent to engage the outer edges of the ends $d$, the bottom $a$ being drawn, pressed or otherwise operated upon to form a substantially inverted V-shaped ridge $e$ extending centrally and longitudinally of the pan for a purpose presently explained. The ends $d$ are slitted with the portions thereof upon opposite sides of the slit bent to form inwardly directed projecting portions $f$ designed to fit within the groove $g$ formed as the result of providing the ridge $e$ and for the purpose of strengthening the ridge at its ends.

In practice, dough for two loaves of bread, or other commodity, is placed in each pan upon opposite sides of the ridge $e$ for the purpose of baking a twin or Siamese or double loaf of bread, cake, or other commodity. The ridge $e$ in the bottom of each pan causes the formation of a depression or groove in the bottom of the loaf, dividing it into two equal parts, and also causing the upper crust of the loaf to part along a line directly above and parallel to the depression or groove in the lower crust, with the result that the sides and bottom of the parting in the upper crust bake into a neat and tasty half crust or "gash crust."

The double loaf of bread 7, shown in Fig. 2, illustrates a twin, Siamese, or double loaf of bread, cake, or other commodity baked in my improved pan, showing the upper and lower grooves 8 and 9, respectively, which permit of the commodity being sold as one loaf or easily and readily broken along the line of the grooves 8 and 9 and sold as two loaves. By virtue of the upwardly directed ridge $e$, the area of heat applied to the bread is increased, and while the ridge $e$ extends upwardly within the pan only a short distance, it provides for the division of the dough sufficiently to make it possible to separate the loaf equally, but not sufficiently to allow it to dry out. The groove 9 has the advantage of throwing the loaf upwardly in the center and while the bread is baking in the oven in my improved pan, the groove gradually divides the two pieces on top and gives the top of the loaf the effect of a "slash," which aids not only in breaking or separating the two loaves, but which increases the attractiveness of the loaf.

What is claimed is:—

1. A bread baking pan comprising a bottom, sides and ends, the bottom having an inwardly directed ridge disposed longitudinally and centrally of the pan with its sides sloping downwardly and with its upper edge terminating short of a point midway of the center of the pan from top to bottom to form a groove in the lower crust of the loaf and cause the upper crust of the loaf to part along a line above and parallel to said groove in the lower crust.

2. A baking contrivance comprising a plurality of baking pans, each pan having an inwardly directed ridge disposed longitudinally and centrally thereof with its sides sloping downwardly and with its upper edge terminating short of the horizontal center of the pan to form a groove in the lower crust of the loaf and cause the upper crust of the loaf to part along a line above and parallel to said groove in the lower crust, and a strap embracing the pans to connect them together.

In testimony whereof I affix my signature, in presence of two witnesses.

GEORGE MUELLER.

Witnesses:
JOHN A. STREET,
ALICE L. MANNING.